(12) United States Patent
Ogawa

(10) Patent No.: US 6,256,126 B1
(45) Date of Patent: Jul. 3, 2001

(54) NB-WDM SYSTEM AND METHOD FOR ESTABLISHING WAVELENGTH NUMBER INFORMATION OF SAME

(75) Inventor: Yoshito Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/082,519

(22) Filed: May 21, 1998

(30) Foreign Application Priority Data

May 23, 1997 (JP) .................................................... 9-132700

(51) Int. Cl.[7] ........................... H04B 10/00; H04B 10/16; H04B 10/08
(52) U.S. Cl. ............................................. 359/124; 359/177
(58) Field of Search .................................. 359/174, 176, 359/177, 179, 110, 124–134

(56) References Cited

U.S. PATENT DOCUMENTS

| | | |
|---|---|---|
| 4,245,245 | 1/1981 | Matsumoto et al. . |
| 5,251,324 | 10/1993 | McMullan, Jr. . |
| 5,440,418 * | 8/1995 | Ishimura ............................... 359/177 |
| 5,654,816 * | 8/1997 | Fishman ............................... 359/177 |
| 6,008,915 * | 12/1999 | Zyskind ............................... 359/110 |
| 6,023,366 * | 2/2000 | Kinoshita ............................... 359/341 |
| 6,064,501 * | 5/2000 | Roberts ............................... 359/110 |

FOREIGN PATENT DOCUMENTS

| | | |
|---|---|---|
| 0667696 | 8/1995 | (EP) . |
| 4-271529 | 9/1992 | (JP) . |
| 6-21897 | 1/1994 | (JP) . |
| 6-69890 | 3/1994 | (JP) . |
| 9116775 | 10/1991 | (WO) . |
| 9419909 | 9/1994 | (WO) . |

OTHER PUBLICATIONS

"Short Slot Proposal" by Bridger, et al, dated Apr. 22–23, 1997 (Full Service Access Network—Optical Access Network) workgroup.

Japanese Office Action, dated Apr. 18, 2000, with English language translation of Japanese Examiner's comments.

* cited by examiner

*Primary Examiner*—Leslie Pascal
*Assistant Examiner*—Agustin Bello
(74) *Attorney, Agent, or Firm*—McGuireWoods LLP

(57) ABSTRACT

It is the object of the invention to provide a NB-WDM system, in which deterioration of a transmission characteristic can be prevented, and a method for establishing a wavelength number information of the same. In the NB-WDM system, in which plural cascaded IN-LINE amplifier stations are connected with a terminal station, and the terminal station establishes a wavelength number information in the format of a supervisory signal. The IN-LINE amplifiers are respectively provided with alarm/control management units, and monitor occurrences of failures of optical signals. Accordingly, the system prevents transfer of wrong wavelength number information caused by a fault in a previous IN-LINE amplifier station, the outputs of optical amplifiers are kept to be moderate, and deterioration of the transmission characteristic can be prevented.

12 Claims, 5 Drawing Sheets

SV SIGNAL = DS1

| CH | 1 | 2 | 3 | 4 | 5 | 7 | 8 |
|---|---|---|---|---|---|---|---|
| SIGNAL | ALARM | ALARM | CONTROL | OW1 | OW2 | WAVELENGTH NUMBER | — |
| CH | 9 | 10 | | | | | 24 |
| SIGNAL | — | — | | — | — | | — |

FIG. 2 PRIOR ART

WAVELENGTH NUMBER

| WAVELENGTH NUMBER BIT 7 | WAVELENGTH NUMBER BIT 6 | WAVELENGTH NUMBER BIT 5 | WAVELENGTH NUMBER BIT 4 | WAVELENGTH NUMBER BIT 3 | WAVELENGTH NUMBER BIT 2 | WAVELENGTH NUMBER BIT 1 | WAVELENGTH NUMBER BIT 0 |
|---|---|---|---|---|---|---|---|

FIG.3 PRIOR ART

| WAVELENGTH NUMBER INFORMATION | | | | | | | |
|---|---|---|---|---|---|---|---|
| WAVELENGTH NUMBER DATA VALID | WAVELENGTH NUMBER BIT 6 | WAVELENGTH NUMBER BIT 5 | WAVELENGTH NUMBER BIT 4 | WAVELENGTH NUMBER BIT 3 | WAVELENGTH NUMBER BIT 2 | WAVELENGTH NUMBER BIT 1 | WAVELENGTH NUMBER BIT 0 |

FIG.5

NB-WDM SYSTEM AND METHOD FOR ESTABLISHING WAVELENGTH NUMBER INFORMATION OF SAME

FIELD OF THE INVENTION

The invention relates to a narrow band wavelength division multiplexed optical communication system (a NB-WDM system, hereinafter), in which the output power of optical amplifier is controlled based on the number of wavelengths of optical signals, and a method of establishing the number of the wavelengths of the same.

BACKGROUND OF THE INVENTION

In the NB-WDM system, a main optical signal and a supervisory optical signal have different signal wavelengths, and are propaged through the same optical fiber. In order to prevent the deterioration of the transmission characteristic of the main signal in a long distance transmission, it is very important that in-line amplifier stations distributed along the optical transmission line are controlled based on a correct information on the number of channels (wavelengths) of the optical signals. Accordingly, the information on the number of the wavelengths (the wavelength number information, hereinafter) of the optical signals is established on the format of the supervisory signal (the SV signal, hereinafter) and transmitted to the respective in-line amplifier stations.

However, if a fault arises in a terminal station or the in-line amplifier station, it is indicates that the wrong wavelength number information is supplied to the down-stream in-line amplifier stations. Accordingly, it is extremely desirable that the NB-WDM system is provided with the function of discriminating whether the wavelength number information is reliable or not.

SUMMARY OF THE INVENTION

Accordingly, it is an object of the invention provide a NB-WDM system, which prevents deterioration of a transmission characteristic.

It is a further object of the invention to provide a method for establishing a wavelength number of a NB-WDM system, by which deterioration of the transmission characteristic can be prevented.

According to the first feature of the invention, a NB-WDM system comprises;
- a terminal station connected with plural cascaded IN-LINE amplifier stations via an optical transmission line,
- means allocated in the terminal station for establishing an information on a number of wavelengths of optical signals (a wavelength number information, hereinafter) on a format of a supervisory signal,
- means respectively allocated in the terminal station and the IN-LINE amplifier stations for discriminating whether the wavelength number information is reliable or not, and
- means respectively allocated in the terminal station and the IN-LINE amplifier stations for transmitting information on results of the discriminations to next down-stream stations.

According to the second feature of the invention, a method for establishing a wavelength number of the NB-WDM system comprises the steps of:
- establishing a wavelength number information in a format of a supervisory signal of optical signals in a terminal station,
- managing the wavelength number information in an IN-LINE amplifier station, and
- detecting occurrence of a failure of the optical signals based on the wavelength number information in the IN-LINE amplifier station.

BRIEF DESCRIPTION OF THE DRAWINGS

The invention will be explained in more detail in conjunction with appended drawings, wherein:

FIG. 2 shows a format of a supervisory signal of the conventional NB-WDM system, FIG. 3 shows a bit arrangement of an information on the number of wavelengths of optical signals, which is shown as CH.7 in FIG. 2, FIG. 5 shows in detail a bit arrangement of the information on the number of the wavelengths in the embodiment of the invention, which corresponds to CH.7 in FIG. 2.

DESCRIPTION OF THE PREFERRED EMBODIMENTS

Before explaining a NB-WDM system and a method for establishing a wavelength number information of the same in the preferred embodiments according to the invention, the aforementioned conventional NB-WDM system will be explained.

Figure 1:
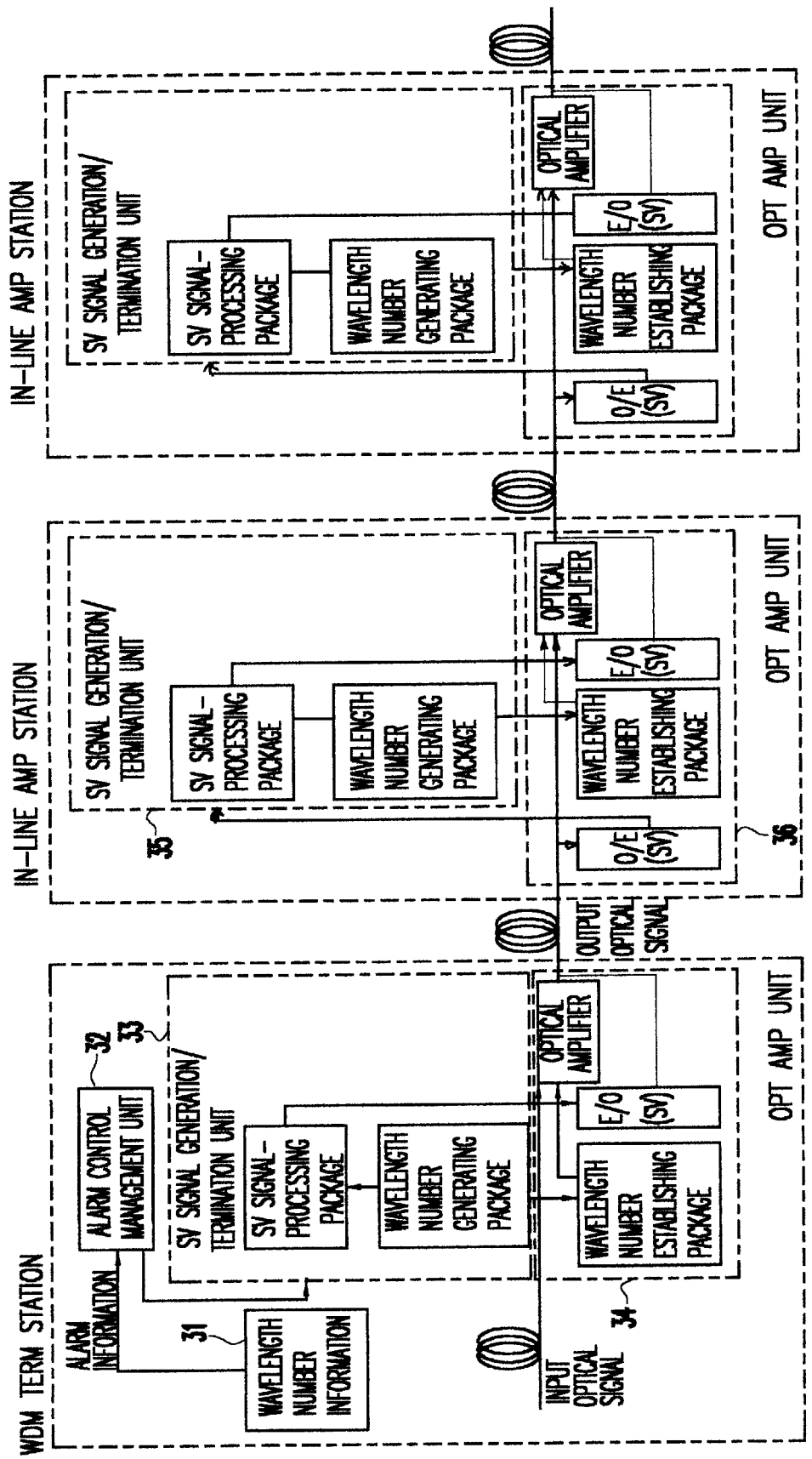
FIG. 1 is a block diagram for showing a conventional NB-WDM system.

FIG. 1 is a block diagram for showing the structure of a conventional NB-WDM system. As shown in FIG. 1, a WDM terminal stations (a WDM TERM station, hereinafter) takes in an information on the number of channels (wavelengths) of the optical signals to be multiplexed in the WDM TERM station as an information on the number of wavelengths (a wavelength number information 31, hereinafter). Usually, the wavelength number information 31 is established by a user via his terminal or an optical signal-multiplexing apparatus by the aid of means for automatically detecting the wavelength number information 31.

The alarm/control management unit 32 in the WDM TERM station discriminates whether the wavelength number information 31 is valid or not, which is converted into a wavelength number-controlling signal by a wavelength number-generating package in a supervisory signal generation/termination unit (a SV signal generation/termination unit, hereinafter) 33. The wavelength number-controlling signal is respectively supplied to a SV signal-processing package in the SV signal generation/termination unit 33 and a wavelength number-establishing package 34 in an optical amplifier unit (OPT AMP UNIT, in drawings).

FIG. 2 and FIG. 3 respectively show the constructions of the wavelength number-controlling signal. FIG. 3 shows the bit arrangement of the wavelength number information, which corresponds to CH.7 in the SV signal format shown in FIG. 2.

In a SV signal-processing package, the wavelength number-controlling signal is converted into the SV signal having the bit arrangement shown in FIG. 2 together with other informations (OW, alarm and control informations), electrical to optical converted by the E/O 34 in the optical amplifier unit 34, and transmitted to the next station together with a main signal.

On the other hand, the wavelength number-controlling signal, which is supplied to the wavelength number-establishing package in the optical amplifier unit, is converted into a signal for controlling the optical amplifier. and controls the output of the optical amplifier.

Next, the operation of the IN-LINE amplifier station will be explained.

The optical signals transmitted from the WDM TERM station (the main and SV signals) are separated into the main signal and the SV signal. The main signal is straightly supplied to the optical amplifier, amplified thereby and transmitted to the next IN-LINE amplifier station.

The SV signal is optical to electrical converted by an O/E for the SV signal, and separated into the OW, alarm, control and wavelength informations. The wavelength number information is converted into the wavelength number-controlling signal by a wavelength number-generating package in a SV signal generation/termination unit 35, converted into a signal for controlling the optical amplifier, and controls the output of the optical amplifier.

The wavelength number information to be transmitted to a next station is constituted as follows. The respective informations composing the SV signal, including the wavelength number information shown in FIG. 3, are separated by a SV signal-processing package, regenerated, and again multiplexed to form a SV signal having the bit arrangement shown in FIG. 2. The SV signal thus obtained is electrical to optical converted by an E/O in the optical amplifier unit 34, and transmitted to the next IN-Line amplifier station.

In the next station, the optical signals are processed in the same way as that in the previous station also.

However, a following disadvantage has been pointed out on the aforementioned conventional NB-WDM system. In a condition that the SV signal generation/termination units 35 of the two adjacent stations are taken off and cannot operated, it the SV signal generation/termination unit is inserted in the down-stream station, this station transmits a wavelength number information stored in its memory (an initially established datum) to the following station, although the SV signal generation termination unit of the adjacent up-stream station is taken-off and the wavelength number information is not supplied to this station. Accordingly, the wrong information on the wavelength number is successively transmitted along the down stream stations.

Figure 4:
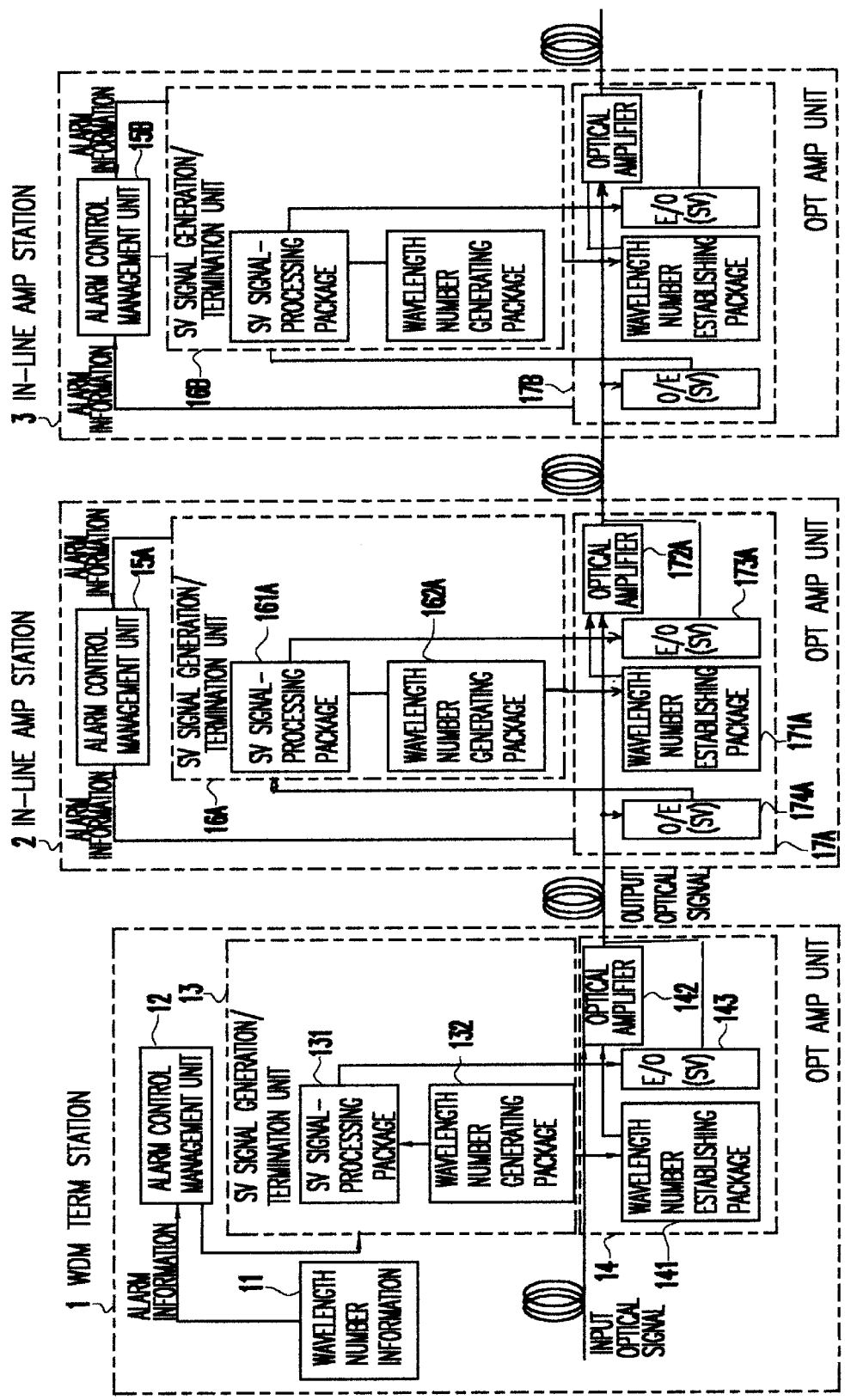
FIG. 4 is a block diagram for showing a preferred embodiment of the invention.

Next, embodiments of the invention on a NB-WDM system and a method for establishing the wavelength number information of the same will be explained in detail referring to the appended drawings. FIG. 4 is a block diagram for exemplifying the structure of the NB-WDM system as a preferred embodiment of the invention. Moreover, FIG. 5 shows in detail the datum for representing the wavelength number information.

As shown in FIG. 4, the NB-WDM system according to the invention is composed of a WDM TERM station 1 and at least two cascaded IN-LINE amplifier stations, respectively denoted by 2 and 3.

In the aforementioned NB-WDM system, the WDM TERM station is composed of a wavelength number information package 11, and an alarm/control management unit 12, a SV signal generation/termination unit 13 and an optical amplifier unit 14.

The IN-LINE amplifier stations 2 and 3 are respectively composed of alarm/control management units 15, SV signal generation/termination units 16 and optical amplifier units 17.

The WDM TERM station land the IN-LINE amplifier stations 2 and 3 are respectively subdivided as follows.

In the WDM TERM station, the SV-signal generation/termination unit 13 is composed of a SV signal-processing package 131 and a wavelength number-generating package 132; and the optical amplifier unit 14 is composed of a wavelength number-establishing package 141, an optical amplifier 142 and a E/O 143 for the SV signal.

In the IN-LINE amplifier station 2 and 3, the SV signal generation/termination unit 16 is composed of a SV signal-processing package 161 and the wavelength number-generating package 162; and the optical amplifier unit 17 is composed of a wavelength number-establishing package 171, an optical amplifier 172, an E/O 173 for the SV signal and an O/E 174 for the SV signal.

The WDM TERM station 1 is set up in a bulding of a key station of a trunk communication line, in which the number of the wavelengths of the NB-WDM system is determined.

The IN-LINE amplifier stations 2 and 3 are repeater stations, which extend the transmission distance between the terminal stations.

First, the number of the wavelengths, i.e. the number of the channels, to be multiplexed in the NB-WDM system is established in the wavelength number information package 11 of the WDM TERM station 1. The alarm/control management unit 12 discriminates whether the established wavelength number information is valid or not, which is converted into a wavelength number-controlling signal by a wavelength number-generating package 132 in a SV signal generation/termination unit 13. The wavelength number-controlling signal is respectively supplied to a SV signal-processing package 131 in the SV signal generation/termination unit 13 and a wavelength number-establishing package 141 in the optical amplifier unit 14.

In the SV signal-processing circuit 131, the wavelength number-controlling signal is converted into a SV signal with a format shown in FIG. 2 together with other SV informations (OW, alarm, and control informations), electrical to optical converted by the E/O 143 for the SV signal in the optical amplifier unit 14, and transmitted to the next IN-LINE amplifier station 2 together with the main signal. In this embodiment, as shown in FIG. 5, a VALID signal is added to the wavelength number information, and when the wavelength number information is not valid on account of fault in the unit, a VALID signal is set to be "0".

On the other hand, the wavelength number-controlling signal supplied to the wavelength number-establishing package 141 in the optical amplifier unit 14 is converted into a signal for controlling the optical amplifier 142 and controls the output of the optical amplifier 142. However, when the VALID signal is "0", the wavelength number information till now is held, and the output of the optical amplifier is controlled based on the held wavelength number information.

Next, the operation of the IN-LINE amplifier station will be explained. The optical signals (the main signal and the SV signal) transmitted from the WDM TERM station are separated into the main signal and the SV signal by an optical amplifier unit 17a, and the main signal is straightly supplied to the optical amplifier 172a, amplified therein and transmitted to the next IN-LINE amplifier station 3.

The SV signal is optical to electrical converted by a O/E 174a for the SV signal, and separated into OW, alarm, control and wavelength number informations by a SV signal-processing package 161a. The alarm/control management unit 15a discriminates whether the separated wavelength number information is valid or not, similarly to the case of the WDM TERM station 1. If the wavelength number information is not valid or the VALID signal supplied from the previous station is "0" the alarm/control management unit 15a sets the VALID signal to be "0". The wavelength number information thus obtained is supplied to a wavelength number-generating package 162a in the SV signal generation/termination unit 16a. The wavelength number information is converted into a wavelength number-controlling signal by the wavelength number-generating package 162a, and respectively supplied to a SV signal-processing package 171a in the SV signal generation/termination unit 16a and a wavelength number-establishing package 171a in the optical amplifier unit 17a. In this way, the wavelength number information controls the output power of the optical amplifier 172a, is included in the SV signal, and transmitted to a next IN-LINE station 3. These procedures are similar to those explained for the case of the WDM TERM station.

In this embodiment, the wavelength number information in the format of the SV signal is provided with the VALID signal. and the VALID signal is set to be "1" in case that the wavelength information is reliable, and the valid signal is set to be "0" in case that the wavelength number information is not reliable.

In case that the VALID signal transmitted form the previous station is "0", this information is unconditionally transmitted to the next station.

In the NB-WDM system, the aforementioned VALID signal is constantly monitored, and the wavelength number information is established based thereon. Accordingly, even in case that the previous station is normally operating but the station before the previous one is faulty (the unit therein is taken off), the information on the unreliableness of the wavelength number information (the VALID signal=0) is successively transmitted to the down stream IN-LINE amplifier stations, Bo that a normal establishment of the wavelength number information is unchanged, and the deterioration of the transmission characteristic can be prevented.

According to the invention, the transfer of a wrong information on the wavelength number, which is caused by a fault in the previous station, can be prevented, and the output of the optical amplifier can be kept to be moderate, so that the deterioration of the transmission characteristic of the NB-WDM system can be prevented.

As seen from the aforementioned explanations, according to the NB-WDM system and the method for establishing the wavelength number information of the same, the wavelength number information is established in the format of the supervisory signal transmitting through the NB-WDM system, and the at least two IN-LINE amplifier stations respectively manages the wavelength number information. The IN-LINE amplifier stations respectively monitor the existence of failures in the optical signals based on the wavelength number information. Accordingly, the transfer of the wrong information on the wavelength number caused by a fault in the previous station can be prevented, the output of the optical amplifier can be kept to moderate, and the deterioration of the transmission characteristic can be prevented. Moreover, even in case that the previous station is normally operating, but the station before the previous one is faulty, the information on the unreliableness of the wavelength number information is successively transmitted to the down stream stations, so that the correct establishment of the wavelength number information in the down-stream station is unchanged. and the deterioration of the transmission characteristic can be prevented.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A narrow band wavelength division multiplexed (NB-WDM) optical communication system comprising:
   a terminal station connected with plural cascaded IN-LINE amplifier stations via an optical transmission line;
   means for generating a wavelength number information in said terminal station for establishing an information on a number of wavelengths multiplexed together in an optical signal transmitted on said optical transmission line;
   discrimination means positioned in said terminal station and in said IN-LINE amplifier stations for determining whether said wavelength number information is reliable and outputting a valid signal; and
   transmitting means positioned in said terminal station and in said IN-LINE amplifier stations for transmitting said valid signal to next down-stream stations.

2. A NB-WDM system according to claim 1, wherein said valid signal is a digital signal added to said wavelength number information.

3. A NB-WDM system according to claim 1, wherein said valid signal is a one bit digital signal.

4. A NB-WDM system as recited in claim 1 wherein said IN-LINE amplifier station further comprises:
   means for holding said wavelength number information and controlling an optical amplifier of said IN-LINE amplifier station based thereon, when said valid signal transmitted from a previous station indicates that said wavelength number information is not reliable.

5. A narrow band-wave length division multiplexing (NB-WDM) system comprising:
   a terminal station connected with plural cascaded IN-LINE amplifier stations;
   a circuit in said terminal station for establishing a wavelength number information indicating a number of channels multiplexed in an optical signal;
   plural alarm/control management units in said plural IN-LINE amplifier stations for setting a valid signal when said wavelength information is correct; and
   means for detecting occurrences of failures of said optical signal in said respective IN-LINE amplifier stations based on said valid signal.

6. A NB-WDM system according to claim 5, wherein said alarm/control management unit transmits said valid signal for notifying said occurrence of said failure of said optical signals to said next IN-LINE amplifier station upon detecting a same.

7. A method for establishing a wavelength number information in a narrow band-wavelength division multiplexing (NB-WDM) system comprising the steps of:
   establishing a wavelength number information in a format of a supervisory signal indicating a number of channels multiplexed in an optical signal in a terminal station;
   managing said wavelength number information in an IN-LINE amplifier station; and
   detecting occurrence of a failure of said optical signal based on said wavelength number information in said IN-LINE amplifier station.

8. A method as recited in claim 7 wherein said step of detecting said occurrence of said failure of said optical signals comprises a step of transmitting a valid signal for notifying said occurrence of said failure of said optical signals to a next IN-LINE amplifier station.

9. A multiplexed optical signal transmission system for preventing deterioration of the multiplexed optical signal due to an amplifier receiving unreliable information regarding a number of channels contained in the multiplexed optical signal, comprising:

a terminal station for originating a multiplexed optical signal comprising a plurality of channels;

a plurality of in-line amplifier stations connected in series to said terminal station by an optical fiber;

said terminal station comprising:

means for generating a supervisory control signal containing channel data information indicating a number of channels contained in said multiplexed optical signal; and means for transmitting said multiplexed optical signal and said supervisory control signal to a first in-line amplifier station;

said plurality of in-line amplifier stations comprising:

an amplifier for amplifying said multiplexed optical signal;

means for controlling said amplifier based on said channel data information; and means for verifying that said channel data information is valid and setting and transmitting a valid signal such that a next in-line amplifier station can rely on said channel data information.

10. A multiplexed optical signal transmission system as recited in claim 9, wherein said in-line amplifier stations further comprise:

an optical to electrical converter for converting said supervisory signal into an electrical signal to control said amplifier.

11. A multiplexed optical signal transmission system as recited in claim 10, wherein said in-line amplifier stations further comprise:

an electrical to optical converter for converting said supervisory signal to an optical signal prior to transmitting to a downstream in-line amplifier station.

12. A multiplexed optical signal transmission system as recited in claim 10, wherein when said valid signal indicates that said channel data information is invalid, said amplifier amplifies the optical signal at a moderate default level to minimize distortion of said optical signal.

* * * * *